(12) United States Patent
Woods et al.

(10) Patent No.: US 10,721,079 B2
(45) Date of Patent: Jul. 21, 2020

(54) DETECTION OF ANOMALOUS KEY MATERIAL

(71) Applicant: Venafi, Inc., Salt Lake City, UT (US)

(72) Inventors: Matthew Woods, Cuppertino, CA (US); Remo Ronca, Salt Lake City, UT (US)

(73) Assignee: Venafi, Inc., Salt Lake City, UT (US)

( * ) Notice: Subject to any disclaimer, the term of this patent is extended or adjusted under 35 U.S.C. 154(b) by 325 days.

(21) Appl. No.: 15/479,581

(22) Filed: Apr. 5, 2017

(65) Prior Publication Data

US 2018/0294975 A1   Oct. 11, 2018

(51) Int. Cl.
*H04L 9/32* (2006.01)

(52) U.S. Cl.
CPC .................. *H04L 9/3268* (2013.01)

(58) Field of Classification Search
CPC ....... H04L 9/3263; H04L 9/08; H04L 9/0861; H04L 9/088; H04L 9/00; G06F 21/57; G06F 11/3447; G06F 11/3452
See application file for complete search history.

(56) References Cited

U.S. PATENT DOCUMENTS

| | | | |
|---|---|---|---|
| 9,009,321 B2 | 4/2015 | Alperovitch et al. | |
| 2004/0114760 A1 | 6/2004 | Brown et al. | |
| 2010/0106560 A1 | 4/2010 | Li et al. | |
| 2012/0102334 A1* | 4/2012 | O'Loughlin | G06F 21/57 713/189 |
| 2012/0216035 A1 | 8/2012 | Leggette et al. | |
| 2014/0025963 A1 | 1/2014 | Subramanian | |
| 2014/0283054 A1 | 9/2014 | Janjua et al. | |
| 2016/0344544 A1 | 11/2016 | Biesinger et al. | |
| 2018/0248905 A1* | 8/2018 | Cote | G06K 9/627 |

FOREIGN PATENT DOCUMENTS

WO   2018187556   10/2018

OTHER PUBLICATIONS

"International Application Serial No. PCT/US2018/026236, International Search Report dated Jul. 13, 2018", 2 pgs.
"International Application Serial No. PCT/US2018/026236, Written Opinion dated Jul. 13, 2018", 6 pgs.

(Continued)

*Primary Examiner* — Lynn D Feild
*Assistant Examiner* — Jessica J South
(74) *Attorney, Agent, or Firm* — Schwegman Lundberg & Woessner, P.A.

(57) ABSTRACT

In representative embodiments, architectures to improve security through use of an anomaly score are disclosed. A set of cryptographic key material is used to create a model based on a dimensionality reduction and a density estimation that captures the expected behavior of the set of cryptographic key material. An anomaly score for presented cryptographic key material is calculated based on the model. The anomaly score represents the divergence from expectations for the presented cryptographic key material. The anomaly score can be used by a relying system to determine whether to trust the presented cryptographic key material. In this way, cryptographic key material that is valid can be tested to determine whether the cryptographic key material should be trusted even though it is valid.

20 Claims, 6 Drawing Sheets

(56) References Cited

OTHER PUBLICATIONS

"International Application Serial No. PCT/US2018/026236, International Preliminary Report on Patentability dated Apr. 26, 2019", 8 pgs.
Duda, R. O., et al., "Pattern Classification", Introduction & Chapter 4, Wiley, New York, NT, (2001), 2-18 & Ch 4.
Duong, Tarn, et al., "Cross-validation Bandwidth Matrices for Multivariate Kernel Density Estimation", Board of the Foundation of the Scandinavian Journal of Statistics. vol. 32, (2005), 485-506.
Gray, Robert M., et al., "Vector Quantization and Density Estimation", Proceedings of the Compression and Complexity of Sequences, (Jun. 1998), 172-193.
Hotelling, Harold, "Analysis of a Complex of Statistical Variables into Principal Components", Journal of Educational Psychology, vol. 24(6), (1933), 417-441.
Hyvarinen, Aapo, et al., "Independent Component Analysis: Algorithms and Applications", Neural Networks, vol. 13, No. 4-5, (2000), 411-430.
Miecznikowski, Jeffrey C., et al., "Bootstrap MISE Estimators to Obtain Bandwidth for Kernel Density Estimation", Communications in Statistics—Simulation and Computation. vol. 39 (7), (Jun. 2010), 1455-1469.
Scott, David W., et al., "Multidimensional Density Estimation", Handbook of Statistics, vol. 24., (2005), 229-261.
Torgerson, Warren S., "Multidimensional Scaling: Theory and Method", Pychometrika, vol. 17 (4), (Dec. 1952), 401-419.
"European Application Serial No. 18781389.4, Extended European Search Report dated Dec. 16, 2019", 6 pgs.

* cited by examiner

DETECTION OF ANOMALOUS KEY MATERIAL

FIELD

This application relates generally to improving security in computer systems and networks and more specifically to systems and methods to assist the identification of anomalous keys and certificates whose properties and attributes deviate from expectation.

BACKGROUND

Assessing the trustworthiness of cryptographic material provided by network services at the point of connection establishment or attached to executable code in the form of digital signatures is a difficult problem. Many solutions limit the validation to a key material's properties, attached metadata, and associated trust-relationships. In addition, whenever possible and applicable, the latest available validity status of an involved key is retrieved from a designated repository. Even then, dangers exist such as delay in updating the validity status of the key material, the lack of network connectivity to allow the retrieval of latest available validity status and so forth. This can result in a system trusting invalid or otherwise compromised cryptographic key material.

It is within this context that the present disclosure arises.

DETAILED DESCRIPTION

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Assessing the security reliance, trustworthiness, and reliability of cryptographic key material can be greatly assisted by identifying anomalous keys and certificates whose properties and attributes deviate from expectation. The present disclosure presents a data driven approach for deriving baseline expectations from cryptographic key material properties and attributes and for using such an expectation to identify anomalous keys and certificates.

The present disclosure identifies anomalous cryptographic key material with respect to a data derived expectation that can be responsive to different key material contexts and the changes to the security landscape that occur with the passage of time. There are many instances where a relying system is presented cryptographic key material and asked to rely on the cryptographic key material to prove authorization, identity, authentication and so forth to grant access to a protected resource, allow the requesting system to perform some function, and/or other such activities. Current systems and infrastructure often (but not always) have a basic mechanism to indicate when the relying system should not trust the presented cryptographic key material. Such mechanisms often rely on revocation status queries, restricting policies, e.g., X.509 name constraints, certificate policies, etc., and/or cryptographic material expiry dates to identify when a system should trust or not trust presented cryptographic material.

Such mechanisms, however, do not account for cryptographic key material and/or systems that are somehow "weak" or "suspect" in some fashion. In other words, the mechanisms are good at identifying when a key has expired or has been revoked, but cannot tell if a key is suspicious in some fashion.

The present disclosure presents mechanisms that can be incorporated into different security infrastructures that allow suspicious cryptographic key material to be identified. The mechanism discloses how to calculate and use an anomaly score, which represents how anomalous (i.e., unexpected) cryptographic key material is. In this sense, anomalous can indicate cryptographic key material that is different in some material way from other cryptographic key material. The anomaly score provides a system with further information to make decisions on whether to trust presented cryptographic key material.

For example, a relying system can send presented cryptographic key material to an anomaly scoring service (in the case where a separate anomaly scoring service is used), or can calculate an anomaly score for the presented cryptographic key material (in the case where the relying system has a plug-in or other local application that can calculate the anomaly score). The score can then be compared to one or more thresholds, and depending on the transgression of one or more thresholds, the relying system can decide to take one or more actions, such as reject the cryptographic key material (i.e., refuse to rely on the key material), accept the cryptographic key material and proceed with a protocol, process, etc. that will perform other checks on the key material and/or allow use of the key material, trigger an exhaustive audit trail, restrict the keys applicability scope, and/or seek additional input, such as from an administrator. Thus, in some embodiments, a single threshold can be used and depending on transgression of the threshold, the system can accept (i.e., continue on with the process) or reject (i.e., terminate the process) the cryptographic key material. In other embodiments, two thresholds can be used, and depending on which threshold(s) are transgressed, accept the key material (i.e., continue on with the process), reject the key material (i.e., terminate the process), trigger an exhaustive audit trail, restrict the keys applicability scope, or seek administrator or other input before deciding what to do. In this latter case, accepting the cryptographic key material is typically on one side of the anomaly score spectrum, rejecting the cryptographic key material is on the other side of the anomaly score spectrum and the middle of the anomaly score spectrum (i.e., between the two thresholds) where it may be unclear what to do, trigger an exhaustive audit trail, restrict the keys applicability scope, seek administrator or other input.

The anomaly score can be utilized separately (i.e., as a separate score) or can be incorporated as a factor into another score, such as a security reliance score. For example, U.S. patent application Ser. No. 14/802,502 entitled "Security Reliance Scoring for Cryptographic Material and Processes" (hereinafter the '502 application), incorporated herein by reference in its entirety, discusses mechanisms to calculate a score based on various properties and attributes of cryptographic key material, protocols, system configurations, and other security infrastructure aspects. The score can be mapped to a vulnerability scale and can give administrators and others information about how "trustworthy" the system, infrastructure, etc. are. The anomaly score of the present disclosure can be incorporated as a property and/or attribute and thus influence the overall security reliance score.

As yet another example, U.S. patent application Ser. No. 15/137,132 entitled "Assisted Improvement of Security Reliance Scores" (hereinafter the '132 application), incorporated herein by reference in its entirety, discusses how to create exemplary models of cryptographic key material, compare the exemplary model to a collection of cryptographic key material and make recommendations to improve the security reliance scores of the collection of cryptographic key material. The calculated anomaly score(s) can also be made part of the security reliance score in these systems and the recommendation system can make recommendations based on the anomaly score as well as based on the other properties and/or attributes disclosed therein.

Calculating anomaly scores is accomplished by selecting a weighted vector of important features of cryptographic key material (called a bias vector), identifying a target dimension to reduce the dimensionality of the cryptographic key material, reducing the cryptographic key material using the bias vector to the target dimension using a numerical method and then creating a model using a density estimation method. These operations are explained below.

Utilizing an anomaly score, either by itself or as part of calculating a security reliance score, allows systems to make judgements on when to trust cryptographic key material that may be valid according to the mechanisms of the security infrastructure, but which may contain a weakness, be suspect, or otherwise have some sort of anomaly that would reduce their trustworthiness. Thus, the systems and methods described herein improve computer security.

DESCRIPTION

Figure 1:
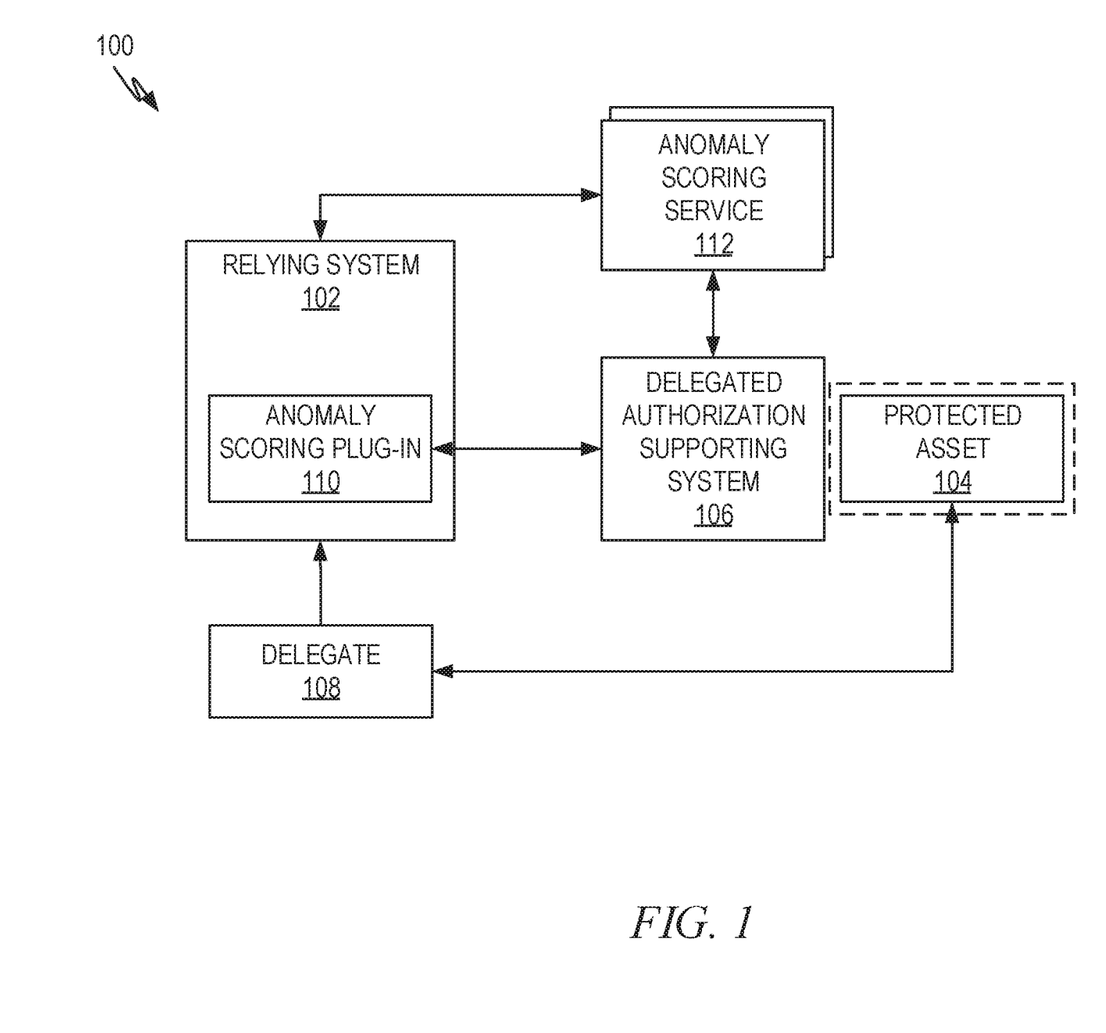
FIG. 1 illustrates an example architecture for calculating and utilizing an anomaly score.

FIG. 1 illustrates an example architecture 100 illustrating use of a service 112 that calculates anomaly scores for cryptographic key material. Cryptographic key material, or more simply key material, means a key, key pair, key instance, and so forth that is used in authenticated communications, to govern authorization to a resource, or to protect an asset. Key pair (KP) means a public/private key combination where the private key may decrypt information encrypted by the public key or where a public key verifies signatures created by the private key. Key set (KS) means all instances of a particular key pair. The key set may be a client key set or a server key set. Key instance (KI) means a single instance of a particular key or key set. The key instance may be a client key instance, a server key instance or a key set instance. Key instance may be part of a key set, or a singular occurrence of a public or private key. Cryptographic key material also has a set of associated attributes, some of which relate to the key material itself (i.e., key length, method of generation and so forth) and some of which relate to how the key is utilized (i.e., attributes related to the security infrastructure, protocols, and so forth). A set of cryptographic key material is utilized, as described herein, to create a model for calculating anomaly score for cryptographic key material. The attributes associated with this key material can relate to the key material itself, can relate to how the key is utilized, or both.

The architecture 100 of FIG. 1 illustrates a system 102 which is asked to rely on cryptographic key material presented by service delegate 108 requesting access to an asset 104 owned by the system 102 and protected by an authorization system 106. One embodiment of this authorization scheme is the OAuth 2.0 framework as described in "The OAuth 2.0 Authorization Framework," Internet Engineering Task Force (IETF), RFC 6749, 2012, with the following role correspondences: relying system 102 corresponds to resource owner, delegate 108 corresponds to client, and delegated authorization supporting system 106 corresponds to authorization server and resource server. Avoiding repetition of different grant types or authorization workflows, FIG. 1, and FIG. 5 simplify the access grant details, asset protection, and separation of authorization and resource management.

To illustrate this context, a delegate 108 requests access to an asset owned by the relying system 102. The delegate 108 authenticates itself either explicitly by means of signed code to be validated via a code signing certificate or implicit by means of a Transport Layer Security (TLS) server certificate authenticating some service endpoint which the relying system 102 has accessed and which implements the delegate 108.

The OAuth 2.0 authorization framework allows the client (i.e., the delegate 108 requesting access to the protected asset 104) to specify the scope of the access request using a "scope" request parameter. Thus, the delegate's 108 access request can incorporate a list of access modes, e.g., "read only" or "write", and/or scope definitions, to specify what access is being requested. For example, Google® Calendar contains APIs that use OAuth 2.0 scopes to view a user's calendar protected by Google's identity platform (see developers.google.com/identity/protocols/googlescopes). In this disclosure, access permissions, scopes, and so forth are referred to as "scope" or "scopes". In OAuth 2.0 scopes are proprietary strings defined by an authorization server. For example, see, e.g., graph.microsoft.io/en-us/docs/authorization/permission_scopes, dev.onedrive.com/auth/msa_oauth.htm#authenticat ion-scopes, developers.google.com/identity/protocols/googlescopes for representative examples of various scopes used by authorization servers.

Scopes can be evaluated as security properties of the delegate's authenticating cryptographic key material. For example, U.S. application Ser. No. 14/802,502 entitled "Security Reliance Scoring for Cryptographic Material and Processes" (incorporated herein by reference) describes mechanisms to calculate security reliance scores. When calculating a security reliance score for cryptographic key material, the mechanisms disclosed therein can use scopes as security properties.

Such scopes can be evaluated by an anomaly scoring service as part of its scoring calculation. Evaluation may be performed individually for each authorization provider or by normalizing similar scope-semantic. For example, Microsoft's cloud storage OneDrive's scope definition "onedrive.readonly" (see dev.onedrive.com/auth/msa_oauth.htm#authentication-scopes) is comparable to Google's drive API definition at www.googleapis.com/auth/drive.readonly (see developers.google.com/identity/protocols/google-scopes).

By forwarding the delegate's cryptographic key material and the delegate's scope request, the relying system 102 can now query one or many anomaly scoring services 112 for an anomaly score.

Anomaly scoring services 112 can be implemented as network accessible services operating on a query/response scheme, herein called anomaly score network services, or as a local add-on or plug-in 110 into a relying system's app submitting the access grant or denial to the delegated authorization supporting system 106. The scoring services 112 and/or add-on/plug-in are herein called deployed anomaly score services.

As described in greater detail below, deployed anomaly scoring services use dimensionality reduction mapping, kernel density estimation bandwidth matrix, and density estimation. In one embodiment, the dimensionality reduction mapping, the kernel density estimation bandwidth matrix, and the density estimate are determined centrally from a large repository of data. In the case of an add-on/plug-in or other anomaly scoring service deployed to the relying system 102, the dimensionality reduction mapping, the density estimate, and the bandwidth matrix can be deployed to the relying system 112 in order to allow local calculation of anomaly scores. Once deployed, the dimensionality reduction mapping and bandwidth matrix may be kept constant, while the density estimate can optionally be updated online in response to incoming data encountered in the deployed anomaly score service. Optionally, the updates could be sent back to the central server for integration into the full model.

Alternatively or additionally the delegated authorization supporting system 106 can also query a network accessible anomaly scoring service 112 for an anomaly score for the delegate 108 based on the delegate's scope request, and/or security properties of the delegate's cryptographic key material forwarded by the relying system 102, e.g., the TLS server certificate authenticating some service endpoint to which the relying system 102 has connected and which is implementing the delegate 108, and/or security properties collected at some point of the delegate's registration with the authorization system, e.g., as part of the client registration as described in "The OAuth 2.0 Authorization Framework," Internet Engineering Task Force (IETF), RFC 6749, 2012, and/or based on access to cryptographic key material associated with the delegate. For example, an authorization service might have direct access to the plug-in's code signing certificate within a service platform's marketplace.

As a result of receiving an anomaly score computed by an anomaly scoring service 112, the relying system 102 decides to deny or grant access and/or the delegated authorization supporting system 106 can terminate or proceed with the grant request process based on the received anomaly score.

In case of an access grant, the requesting delegate 108 obtains authorization for accessing the protected asset 104, within the requested scopes, if applicable. For example, in OAuth 2.0's authorization code grant workflow this is achieved by the user agent, which is employed by the relying system 102, forwarding an authorization code issued by the delegated authorization supporting system 106 to the delegate 108 which in turn transfers the authorization code to the delegated authorization supporting system 106 in exchange for an access token issued by the delegated authorization supporting system 106, (see "The OAuth 2.0 Authorization Framework," Internet Engineering Task Force (IETF), RFC 6749, 2012).

Figure 2:
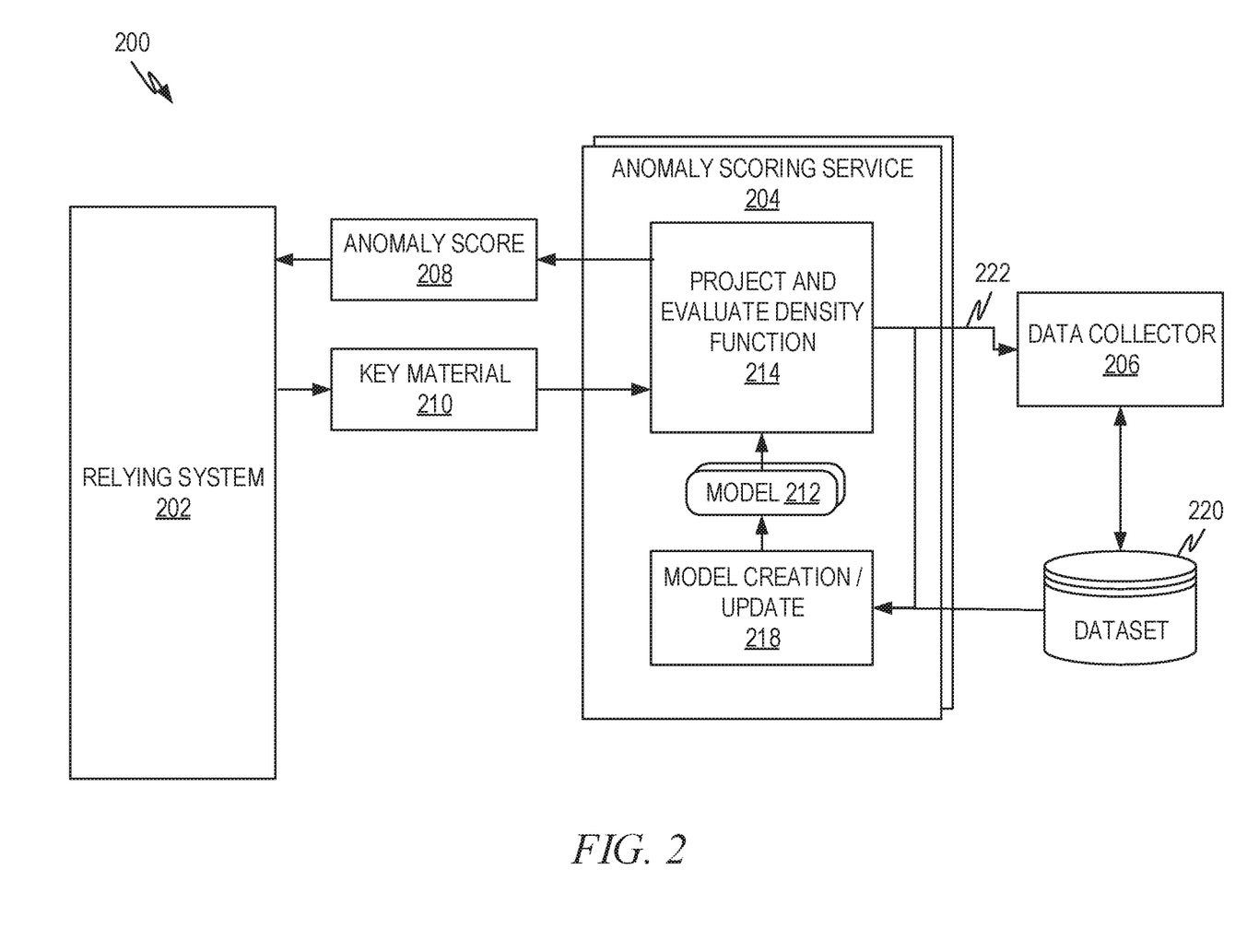
FIG. 2 illustrates an example architecture for calculating and utilizing an anomaly score.

FIG. 2 illustrates an example architecture 200 diagram illustrating use of one or more anomaly scoring services 204 that calculate the anomaly score that for a cryptographic key. The anomaly scoring service 204 can represent the anomaly scoring service 112 or the anomaly scoring plug-in/add-on 110 described in FIG. 1. The architecture 200 illustrates two "phases" that are used by the anomaly scoring service(s) 204 to calculate the anomaly score for the presented cryptographic key material 210. In the first phase, illustrated by model creation/update process 218, appropriate reduction and density functions are derived from a dataset 220 in order to create an anomaly scoring model(s) 212. In the second phase, illustrated by projection and density evaluation function 214, the anomaly score model(s) 212 is used to calculate the anomaly score 208 for the presented cryptographic key material 210.

The different instances of anomaly scoring service(s) 204 are determined by one or more derived models 212 which is used for the key material's 210 anomaly score calculation. Thus, a relying system 202 would present key material 210 and receive in response a single anomaly score 208. Additionally, or alternatively, an embodiment can include a single anomaly scoring service 204 that calculates multiple anomaly scores based on different models 212. In this embodiment, key material 210 presented to the anomaly scoring service 204 may return an anomaly score 208 for each anomaly model 212 created (e.g., by process 218) and used (e.g., by process 214) by the service. In a further example, the relying system 202 can present information to the anomaly scoring service 204 and identify which model(s) the relying system desires to be tested. Thus, the relying system 202 can receive information from the anomaly scoring service 204 about the different models available for calculating an anomaly score and the anomaly scoring service 204 will calculate the corresponding score(s) and return the scores 208 to the relying system 202. In yet a further example embodiment multiple anomaly scoring services 204 can exist, each of which are based on one or more anomaly score models 212. A relying system 202 can present the key material 210 to selected anomaly scoring services 204 based on models that the relying system 202 desires to be tested. In this situation, a relying system 202 can receive information from each of the anomaly scoring services 204 and about the models used by the different scoring services 204. The relying system 202 can then select one or more anomaly scoring services 204 and submit the cryptographic key material 210 to the selected anomaly scoring services 204.

Thus, in general a relying system 202 can present key material 210 to one or more anomaly scoring services 204. The key material 210 contains the features (see explanation of FIG. 4 below) for the key material 210. The one or more anomaly scoring services 204 return an anomaly score 208 for each derived anomaly model. Thus, the anomaly score 208 represented can be a single anomaly score or a plurality of anomaly scores. The relying system 202 represents any system that utilizes the anomaly scoring service 204. Thus, in the various scenarios described herein, the relying system can be any system that has a need to rely on a cryptographic key. By way of example and not limitation, a relying system can be a server, client, or other system that receives presented cryptographic key information to prove identity, authorization, and so forth. In yet another example, the relying system can be one of the systems that calculates or utilizes security reliance scores such as described in the previously referenced '502 application and/or a system that identifies and helps a user improve security reliance scores such as described in the previously referenced '132 application. In another examples, the relying system can be a key validity service, an intermediary (any system that acts as an intermediary between other entities), a runtime, or any other entity testing cryptographic key material (i.e., against a debasing condition as described in the '502 application and/or the '132 application) or relying on cryptographic key material.

To create the anomaly model 212 (i.e. by process 218), the anomaly scoring service 204 first identifies a dataset 220 and a weighted list of key features derived from prior knowledge, hereinafter referred to as bias. The larger the dataset 220, the more accurate the model will be, at least up to a point. Thus, in some embodiments, the dataset 220 is selected to have a sufficient number of cryptographic key material to allow development of a model. The dataset can be deemed to be of sufficient size either by imposing a maximal acceptable degree of error attainable by the models generated from the data, or by assessing the degree to which the model error has converged and will not be expected to further decrease with the addition of more data. In general, there are several known mechanisms to those of skill in the art to select a dataset size and any can be used with embodiments herein.

Additionally, or alternatively, data selection methods like windowing and weighting can also be used to give more weight to cryptographic key material having particular characteristics (e.g., newer cryptographic key material). In yet another representative example, statistical methods exist to estimate the number of cryptographic key material needed to have a good basis for a model, and selection methodologies (e.g., take the last N entries) can be utilized to select an appropriate subset of data from a larger dataset to have an appropriate number of cryptographic key material. Thus, in some embodiments, an entire dataset 220 can be used while in other embodiments a subset of a larger dataset can also be used as the dataset 220.

The data collector 206 collects cryptographic key material to be used in dataset 220. As such, the data collector 206 can be any system that collects cryptographic key information (with its attendant features) to be included in the dataset 220. In some embodiments, the dataset 220 includes cryptographic key material gathered as part of security reliance scoring (i.e., the '502 application and/or the '132 application previously incorporated by reference above). However, any data collector that collects the desired set of cryptographic key material for dataset 220 can be used.

Once the dataset 220 and a bias have been identified, model creation operation 218 can utilize a dimensionality reduction and kernel density calculation. These steps are discussed further below in conjunction with FIG. 3. Arrow 222 illustrates that the project and evaluate density operation 214 can present information it is evaluating (i.e., the key material 210) to the data collector 206 so that the key material can be added to the dataset 220 as well as be utilized for updating the model 212 (i.e. by process 218). Updating the model 212 is described in detail in FIG. 3.

Once the anomaly model 212 has been created, the relying system 202 can then present cryptographic key material 210 to the anomaly scoring service 204 and receive from the anomaly scoring service the anomaly score 208 for the presented key material 210, as discussed above. As discussed herein, the relying system 202 may determine how to treat the cryptographic key material 210 based on the anomaly score 208. Options on how the relying system may choose to respond based on the anomaly score 208 are discussed below in conjunction with FIG. 5.

In addition, instead of the relying system 202 querying for an anomaly score, the security reliance score calculated by a system as described in the '502 application can be further affected by anomaly detection as part of calculating the operation 208 in that patent application (illustrated as process 502 of FIG. 5 in the '502 application). As disclosed in the '502 application, anomaly detection examines the likelihood of the specific occurrence of the cryptographic material and/or the likelihood of specific context configuration for the cryptographic material when compared to a test group of similar samples. The '502 application describes how anomaly detection of the '502 application is used as part of the overall security reliance score calculated as described in the '502 application.

In addition to the anomaly detection described in the '502 application, or as an alternative to the anomaly detection described in the '502 application, the anomaly score 208 of the present disclosure can be used to adjust the overall security reliance score as described in the '502 application. In other words, operation 208 of FIG. 2 in the '502 application can incorporate the anomaly score 208 of FIG. 2 of the present disclosure.

Another use for the anomaly score 208 of FIG. 2 of the present application is in conjunction with a system that guides administrators to strengthen the security of their systems such as that disclosed in the '132 application. In the 132 application, methods are disclosed that illustrate how an exemplary model can be used in conjunction with a set of cryptographic key material (i.e., a target comparison set) to identify changes that would be most beneficial to strengthen the overall security of an enterprise. For Example, FIG. 11 and related text of the '132 application describes creation of an exemplary model for use in making security reliance improvement recommendations. As described therein, selection of the exemplary model can require a tie-breaking criteria. The anomaly score 208 of the present application can be used as just such a tie-breaking criteria. For example, the anomaly scores 208 of the various cryptographic key material can be used in adjusting an overall security reliance score (i.e., as described above), or an anomaly score (e.g., average, minimum, maximum, etc.) that represents the anomaly scores of the cryptographic key material that underlies the different models. This anomaly score can then be used as the tie-breaker, such as by selecting the model with the least anomalous scores. For example, if the chosen comparison set is broadly scoped, a low anomaly score might constitute a desirable quality.

Figure 3:
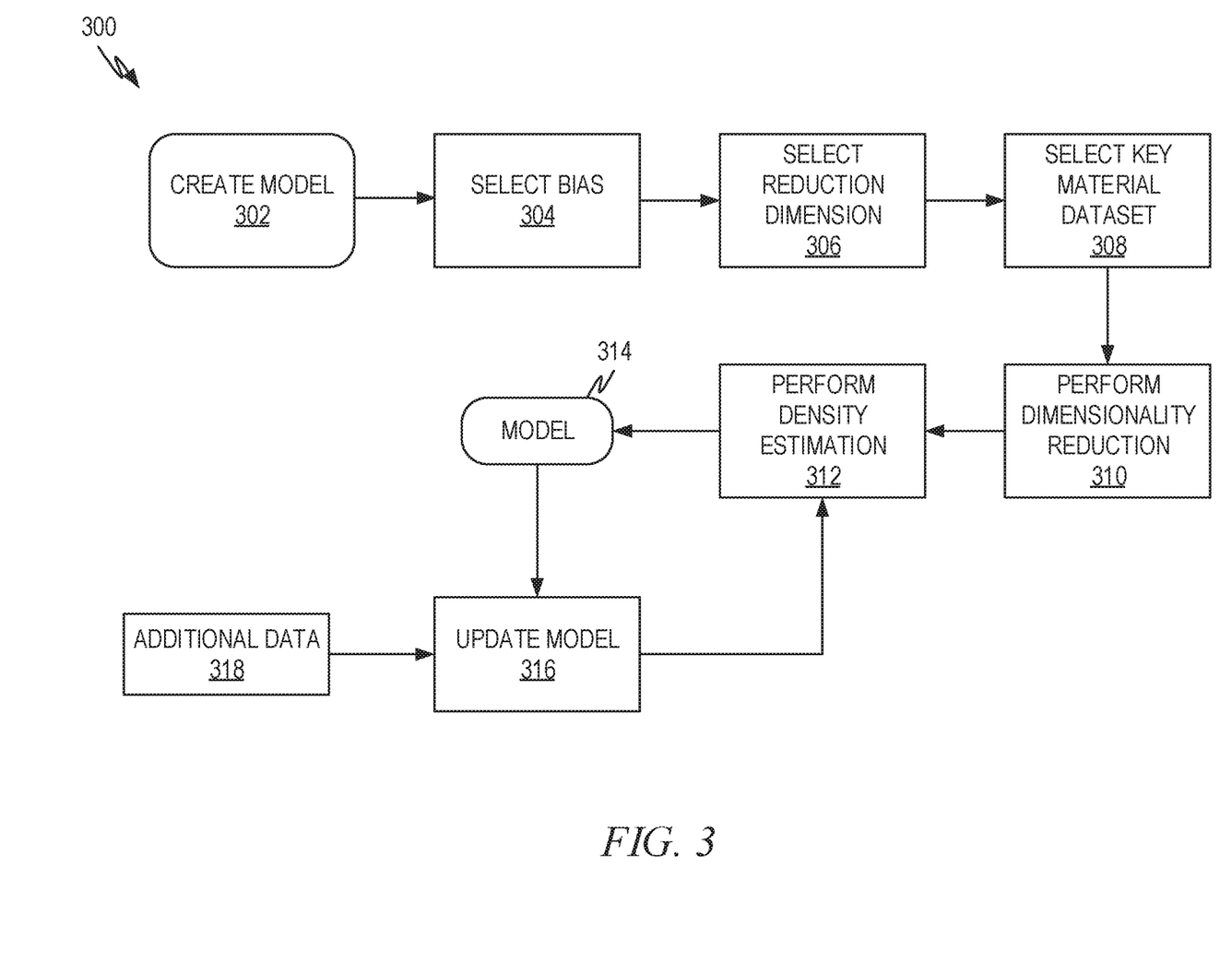
FIG. 3 illustrates a representative flow diagram for creating and updating a model for calculating an anomaly score.

FIG. 3 illustrates a method 300 to create a model for calculating the anomaly score. The method 300 begins at operation 302. In order to create a model, the inputs are first gathered. These are represented by operations 304, 306 and 308. In operation 304 a weighted list of key features is derived from prior and/or expert knowledge, e.g., application of '502, where the bias vector $<w_0, \ldots, w_k>$, where $w_i \in [0,1]$, $0 \le i \le k$, are feature weights, is configured by using the security properties and weights as defined therein, application '132, where the bias vector is configured according to high impact properties for an overall reliance score optimization as described therein, or from application Ser. No. 15/236,043 filed on Aug. 12, 2016 and titled "Cryptographic Key Control Based on Debasing Likelihood Estimation" (hereinafter the '043 application), where the bias vector is configured by the predictive feature set that distinguishes debased from non-debased key-material as described therein. Features may encompass security properties and attributes as defined in the '502 application or, in the context of delegated authorization schemes, include authorization scopes, user ratings or registration dates for software add-ons for an operation and/resource management platform allowing for a delegate's access to an asset owned by a relying system. Once selected, such features can be subject to a weight bias, e.g., in one embodiment the vetting type, key size, and the issuance date of the TLS server certificates employed by a service requesting access to protected resources owned by the relying system are assigned a high weight whereas features like HTTP Public Key Pinning (HPKP) or DNS-based Authentication of Named Entities (DANE) are assigned a low weight, i.e., <0.6, 0.7, 0.55, 0.2, 0.1>, where the components are "vetting type", "key size", "issuance date", "HPKP", "DANE". As an example for a bias vector configuration based on the security properties' weight as introduced in application '502 the vector could be defined as <0.2, 0.15, 0.25, 0.2>, where the components are the security properties $P_0$ ("TLS configuration"), $P_1$ ("TLS Security"), $P_2$ ("Certificate Context"), $P_3$ ("Certificate Security"), and $P_4$ ("Revocation Infrastructure").

In operation 306 the reduction dimension N could be selected on the basis of multiple possible criteria including but not limited to the proportion of total variance captured, the quantity of available data, or storage/computational requirements, etc.

Operation 308 selects the dataset of cryptographic key material that will be used to create the model; hereafter referred to as the training data. For example, the training data could comprise of a subset of the available key material, i.e., dataset 220 as a result of data collection 206, filtered by a specific industry vertical, e.g., TLS certificates of all health care providers in the United States. In some embodiments this represents an entire dataset and in other embodiments, the selected dataset is a subset of a larger available dataset.

Operation 310 represents the methodology to perform dimensionality reduction by, e.g., principal component analysis (Hotelling, H. (1933) *Analysis of a complex of statistical variables into principal components*. Journal of Educational Psychology, Vol 24(6), P. 417-441), independent component analysis (Hyvärinen, A., Oja. E., (2000) *Independent Component Analysis: Algorithms and Applications*. Neural Networks. 4-5, 13, P. 411-430), etc. In one embodiment a low dimensional linear subspace of the ambient input space is found via weighted Principal Component Analysis (PCA). This is done by applying a singular value decomposition to the covariance matrix of the weighted data. Eigenvectors of the weighted data covariance matrix are sorted by their corresponding eigen values, and the low dimensional space is taken to be the space spanned by the first N eigenvectors.

Operation 312 represents the density estimation performed on the lower dimensional representation of the data, such as by Parzen Windows (Duda. R. O., Hart, P. E., Stork. D. G., (2001) *Pattern Classification*. Wiley, New York. N.Y., Chapter 4, p. 2-18), Vector Quantization (Gray, R., Olshen, R., (1997) *Vector Quantization and Density Estimation*. Proceedings of the Compression and Complexity of Sequences, June 11-13, P. 172), Multivariate Histograms (Scott, D. W., Sain, S. R., (2004) *Multi-dimensional Density Estimation*. In Data Mining and Data Visual Visualization. Handbook of Statistics, Vol. 24), or Kernel Density Estimation (KDE) (Duong, T., Hazelton, M., L. (2005) *Cross-validation Bandwidth Matrices for Multivariate Kernel Density Estimation*. Board of the Foundation of the Scandinavian Journal of Statistics). In one embodiment, density estimation is performed with a Kernel Density Estimation procedure in which the data is convolved with a Gaussian kernel with symmetric positive definite bandwidth matrix H, leading to the formula for the estimated density $\hat{f}$ given by:

$$\hat{f}(\vec{x}; H) = \frac{1}{n}\sum_{i=1}^{n} K_H(\vec{x} - X_i)$$

where $X_i$ is the $i^{th}$ of n data points used to fit the model, $K_H$ is the Gaussian kernel with symmetric positive definite bandwidth matrix H given by:

$$K_H(\vec{x}) = |H|^{-1/2} K(H^{-1/2}\vec{x})$$

where K is the standard multivariate Gaussian:

$$K(\vec{u}) = \frac{1}{\sqrt{(2\pi)^N}} \exp\left(-\frac{1}{2}(\vec{u}^T \cdot \vec{u})\right)$$

and N is the dimension of the input space.

Various methods exist for determining the values of the bandwidth matrix, and are known to those skilled in the art, including asymptotic methods, bootstrap methods, and cross-validation methods (Miecznikowski, J. C., Wang, D., Hutson, A. (2010) *Bootstrap MISE Estimators to Obtain Bandwidth for Kernel Density Estimation*. Communications in Statistics—Simulation and Computation. Vol. 39 (7)). In one embodiment, the bandwidth matrix may be determined once from the training data, and held constant during any updates that may happen in a deployed anomaly score service. For example, as discussed above, the density estimate and the bandwidth matrix can be deployed to the relying system's local add-on or plug-in. Once deployed, the dimensionally reduction mapping and bandwidth matrix may be kept constant, while the density estimate can be (optionally) updated in response to incoming data encountered in the deployed anomaly score service.

At this point, the model 314 has been determined.

The model can be updated as illustrated by operation 316. Updating a model augments the existing model 314 by changing the kernel density estimate in response to additional data 318 to a weighted sum of the prior density estimate and the density estimate of the new data Due to the additivity of the kernel density estimates, two models that were created with the same bandwidth matrix, and using the same dimensionality reduction mapping, can be combined to result in a model that is identical to the model that would be produced by fitting the union of the two datasets. If $\hat{f}_t$ is a kernel density model fit to a training dataset, $$\hat{f}_t(\vec{x}; H) = \frac{1}{n_t}\sum_{i=1}^{n_t} K_H(\vec{x} - X_{t,i})$$

and $\hat{f}_\alpha$ is a model fit on an independent dataset (eg., data encountered in a deployed environment), $$\hat{f}_\alpha(\vec{x}; H) = \frac{1}{n_\alpha}\sum_{i=1}^{n_\alpha} K_H(\vec{x} - X_{\alpha,i})$$

the combined model:

$$\hat{f}_c(\vec{x}; H) = \left(\frac{n_t}{n_t + n_\alpha}\right)\hat{f}_t(\vec{x}; H) + \left(\frac{n_\alpha}{n_t + n_\alpha}\right)\hat{f}_\alpha(\vec{x}; H)$$

will provide a means for evaluating anomalies based on the union of the two datasets, without requiring transfer of the raw data between the two parties. For situations that have deployed anomaly scoring services (i.e., services that have been deployed to a relying system such as 110 of FIG. 1), the deployed anomaly scoring services can be used to update anomaly scoring network services (i.e., such as anomaly scoring service 112), or vice versa. Thus, deployed anomaly scoring services can periodically send their models to allow the networks services to check anomaly scores based on the union of the datasets used to generate the models. Network services can also periodically send their models to deployed anomaly scoring service, enabling the deployed service to check anomaly scores based on the union of the datasets used to generate the models.

The method 300 illustrated in FIG. 3 can be used either to create an initial model or to update an existing model. Thus, operation 302 represents any conditions under which initial creation of a model is performed whereas 316 represents any conditions under which a model update may be triggered. By way of example only, a user (administrator, etc.) can trigger the method 300 to create an initial model whereas a deployed add-on to a software component evaluating key material at the point of network connection may trigger the update 316 of an existing model. As another example, updates may be triggered by one or more events, such as based upon changes in the underlying dataset, new data collected, and so forth.

Figure 4:
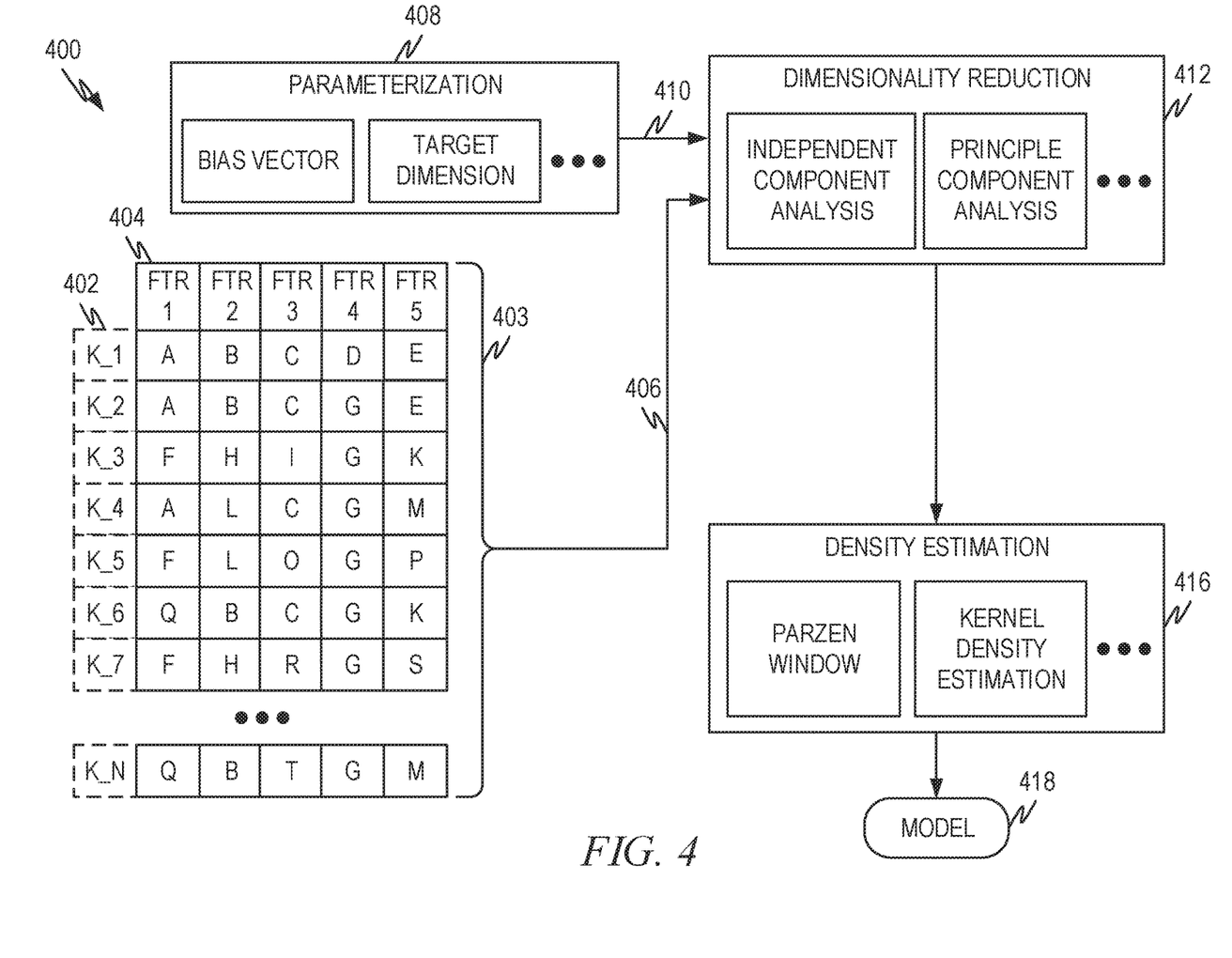
FIG. 4 illustrates a representative flow diagram for creating and updating a model for calculating an anomaly score.

FIG. 4 is a diagram illustrating one method 400 to calculate the anomaly score model. This figure will be used to describe generally how model creation works in a representative example, as well as two specific example implementations. The method depicted in FIG. 4 is applied in 304, 306, 310, 312, and 314. The dataset 403 utilized to develop the model 418 comprises a plurality of cryptographic key material ($K_1 \ldots K_N$) 402, each with associated features 404, with values of A, B, C, . . . . The dataset 403, the bias vector, and the target dimension (i.e., 408) form the input into the model creation method as indicated by 406 and 410.

The first aspect in the embodiment of FIG. 4 is to identify those features that are important to the type of anomalies being detected, to evaluate the relative importance of the included features, and to choose the target dimension N for the dimensionality reduction mapping. These can be evaluated based on knowledge of how the underlying features relate to the anomalies being detected. As representative examples, discussed further below, guidance from organizations such as the Internet Engineering Task Force (IETF), the National Institute of Standards and Technology (NIST) and other such "best practice" guidance may be used to identify which underlying features are relatively more important and which are relatively less important. The '502 application discusses using such information to identify features for overall security reliance scoring. A similar approach can be applied here.

In a first representative example TLS X.509 server certificates with their security properties TLS configuration. TLS Security, Certificate Context, Certificate Security, and Revocation Information as defined in the '502 application are used as salient material from a dataset. The weight of the attributes hashing algorithm as part of a certificate's signature algorithm, the public key's cryptoperiod, the key's security strength, HSTS support (all defined in the '502 application), and the X.509 certificate's notBefore date as defined in D. Cooper et al., "Internet X.509 Public Key Infrastructure—Certificate and Certificate Revocation List (CRL) Profile." Internet Engineering Task Force (IETF)—Network Working Group, RFC 5280, 2008, is increased by 10%, whereas the weight of the attributes HPKP and DANE support (also defined in the '502 application) is decreased by 15% compared to the weight baseline of 100% for the remaining attributes as defined in the '502 application. By setting the target dimension to three the parametrization 408 is completed. As dimensionality reduction 412 method "principal component analysis" and as density estimation 416 the "kernel density estimation" is chosen. The resulting model for this example may be deployed as part of a user-agent, e.g., web browser, plug-in such as illustrated in 110 of FIG. 1.

In a second representative example SSH server keys are drawn as key material from a dataset. The weight of the attributes security strength of the server host key(s) and key-exchange algorithm, security strength of the weakest negotiable symmetric transport layer algorithm—as defined in T. Ylonen, "The Secure Shell (SSH) Transport Layer Protocol," Internet Engineering Task Force (IETF)—Network Working Group, RFC 4253 in conjunction with NIST's security strength classification in E. Barker, "Recommendation for Key Management—Part 1: General (Revision 4)," NIST Special Publication, SP 800-57R4, 2016, National Institute of Standards and Technology—, and geo-location of the IP address of the SSH server for which the key has been collected, is increased by 10%, whereas the weight of the attributes protoversion as part of the SSH-protoversion-softwareversion identification string exchange—again as defined in RFC 4253—is decreased by 15% compared to the weight baseline of 100% for the remaining attributes. By setting the target dimension to 2 the parametrization 408 is completed. As dimensionality reduction 412 method "independent component analysis" and as density estimation 416 the "Parzen window" is chosen. The resulting model may be employed by a security reliance score system to adjust the overall reliance score of collected SSH server keys as described in the '502 application.

The above first and second examples illustrate how different models can be created based on different parametrization, different dimensionality reductions, different density estimations, and a selected dataset. The illustration of FIG. 4 shows how a dimensionality reduction method can be used with a density estimation method to create a model for anomaly scoring. A wide variety of parameterizations, dimensionality reductions, density estimations, and model creation methodologies may thus be employed to create the desired model for the desired anomaly score. Other types of models and anomaly scores can be used in other embodiments and the disclosure herein is sufficient to allow those of skill in the art to apply the methods and systems disclosed herein to different model types and anomaly scores.

Figure 5:
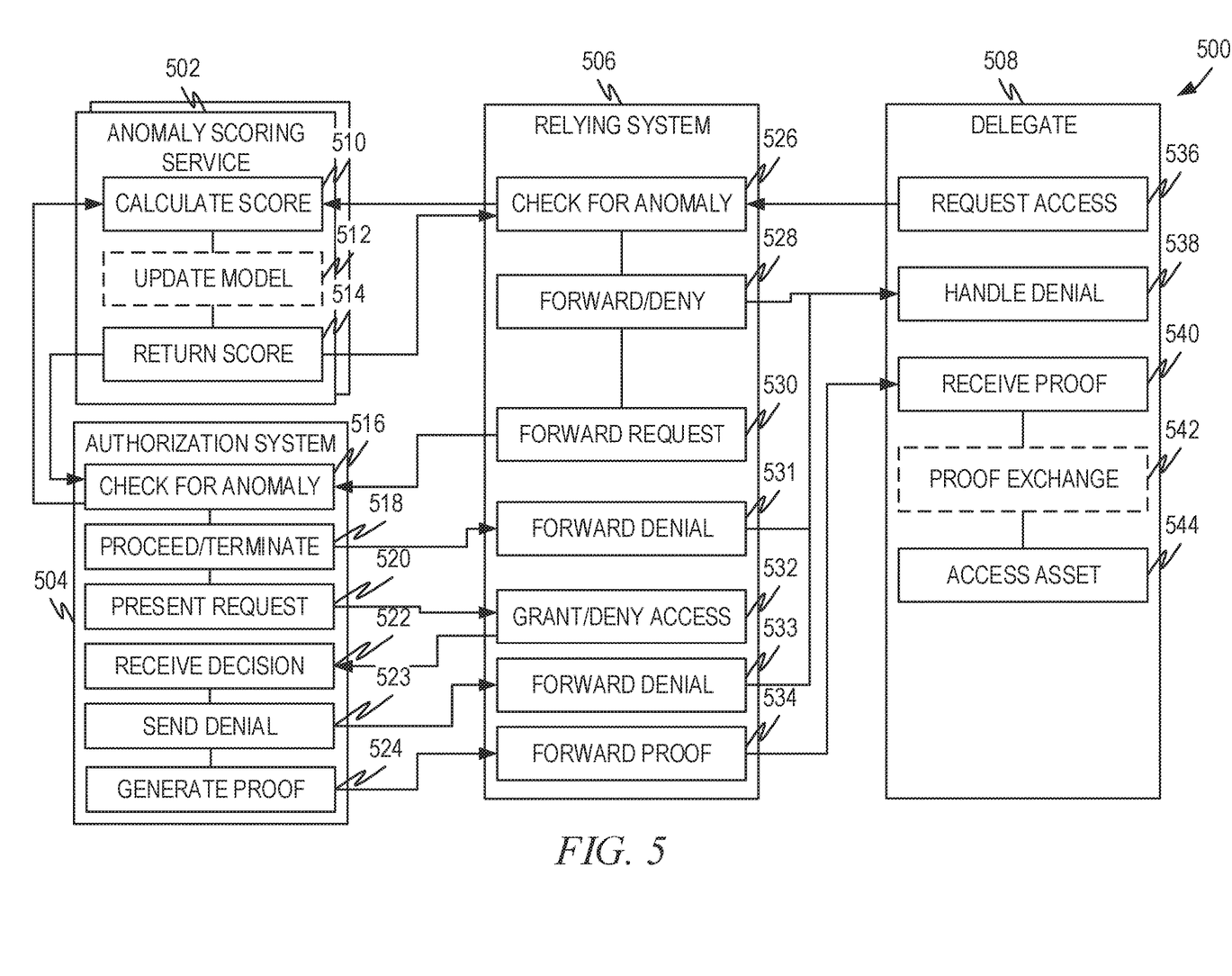
FIG. 5 illustrates an example architecture for calculating and utilizing an anomaly score.

Using one or more anomaly scoring service(s), system(s), etc. can be made part of any protocol or system where a system is asked to rely on presented cryptographic key material. The various systems that do validity checks can add calculation of an anomaly score and make a decision based on the anomaly score whether the system should proceed with the protocol, reject reliance on the material and/or perform some other action as described herein. FIG. 5 presents a representative situation where the anomaly scoring service(s) can be used.

FIG. 5. is a diagram 500 showing how anomaly scoring service(s) can be made part of a protocol where a delegate is requesting access to a resource. FIG. 5 shows representative operations performed by various systems when calculating and utilizing the anomaly score for a delegate's cryptographic key material and/or other security properties.

The diagram 500 illustrates a delegate system 508, which is requesting access to an asset owned by the relying system 506 and protected by the authorization system 504. The anomaly scoring service 502 can be a network based service or can be a plug-in, or other type of anomaly scoring service, application, etc. deployed to the relying system and/or authorization system.

A relying system 506 represents any type of system which owns a protected asset which a delegate 508 requests access to. As previously described, the relying system 506 can be a system (such as system 102), the systems described in the '502 application and/or the '132 application, or any other entity assessing the anomaly of cryptographic key material. The cryptographic key material is obtained by the relying system 506 (operation 526) as part of an asset access request (operation 536) by the delegate 508 either by means of signed code to be validated via a code signing certificate or by means of a TLS server certificate authenticating some service endpoint which the relying system 506 has accessed and which implements the delegate 508.

On receipt of the cryptographic key material and/or scope definitions for the asset access, the relying system 506 can have an anomaly score calculated and decide to proceed or deny access based on the score. For example, the relying system 506 sends a query for an anomaly score (operation 526) to the anomaly scoring service and makes a decision whether to proceed with processing or deny access (operation 528). In other words, based on the anomaly score, the relying system 506 can decide to terminate further engagement with the delegate system 508 when the anomaly score shows an unacceptable deviation from the relying systems expectations. This is typically determined by setting a threshold of acceptable deviation (i.e., a threshold for the anomaly score) and if the threshold transgresses the threshold (i.e., an indication that the key is more anomalous than the threshold value), the processing can be terminated. In this case, operation 528 determines to deny further processing and the denial is passed to the delegate system 508 in operation 528 as indicated by operation 538. Otherwise the relying system continues to forward the request (operation 530) to the authorization system 504.

When requesting the anomaly score, the relying system 506 can send the request to multiple anomaly scoring services that utilize different models as previously discussed. Each model may be tailored to detect anomalies in a different dimension, such as those previously explained. Where multiple anomaly scores are calculated and/or retrieved, threshold(s) can be set for anomaly scores calculated by different models and the decision to proceed (or terminate) can be based on a logical combination of the scores, such as where processing will be terminated unless all scores fall into the "proceed" range. Other logical combinations are also possible. In one example, if any of the anomaly scores indicate more deviation from expectations than allowable, the relying system 506 can terminate processing (i.e., send a denial to the delegate system 508 as indicated in operation 528 and operation 538).

On receipt of an authorization request (i.e., from operation 530), the authorization system 504 can also query for an anomaly score and decide to terminate the processing of the request in case the scoring reveals an unacceptable deviation from the authorization system's expectation. This is indicated in operation 516 and operation 518. When the authorization system 504 sends a request for an anomaly score (operation 516) the authorization system 504 can send the request to either the same or different anomaly scoring services 502 than those used by relying system 506. The authorization system 504 can check different anomaly scoring services 502 if the authorization system 504 is checking for different anomalies (i.e., models that detect different anomalies) than those checked by the relying system 506.

The decision to proceed or terminate is illustrated by operation 518. As indicated before, one or more thresholds can be set for the anomaly score(s) and when the anomaly score transgresses one or more thresholds, the authorization system can decide to proceed or terminate processing. When multiple thresholds are used, the system may indicate that further information is needed before deciding to proceed or terminate, such as when two thresholds define a middle area between the "proceed" decision threshold and the "terminate" decision threshold. Where multiple anomaly scores are calculated and/or retrieved, threshold(s) can be set for anomaly scores calculated by different models and the decision to proceed (or terminate) can be based on a logical combination of the scores, such as where processing will be terminated unless all scores fall into the "proceed" range. Other logical combinations are also possible. In one example, if any of the anomaly scores indicate more deviation from expectations than allowable, the authorization system 504 terminates processing (i.e., sends information that authorization is not granted to relying system 506 as indicated in operation 531). Otherwise the authorization system continues to present the request to the relying system (operation 520).

Upon presentation of the access request by the authorization system 504, the relying system 506 can grant or deny access as indicated in operation 532.

When the decision by the relying system 506 denies access, the authorization system 504 receives the decision (operation 522) and sends a denial back to the relying system 506 (operation 523) which forwards the denial (operation 533) to the delegate system 508

When the decision by the relying system 506 grants access, the authorization system 504 generates a proof (i.e., proof that the delegate is authorized to access the asset/protected resource) in operation 524 and returns it to the relying system 506. The relying system 506 forwards the proof in operation 534 to the delegate system 508. The delegate system 508 receives the proof in operation 540, and an optional exchange of the authorization poof for an access token between delegate and authorization system might be necessary by a subsequent process which is not part of this application (operation 542). The delegate continues to access the asset by presenting either the authorization proof or an access token (operation 544).

When the anomaly scoring service 502 receives a request to calculate the anomaly score for cryptographic key material, the anomaly scoring service 502 calculates the score (operation 510), optionally updates its model (operation 512) as previously described, and returns the anomaly score to the requesting system (operation 514).

In situations where there is no delegate access request, such as may occur when the systems described in the '502 application and/or the '132 application are the relying system, the relying system can check for anomalies such as in operation 526. The key material can be drawn from a dataset that is accessible to the relying system 506 (e.g., a dataset comparable to 220) and forwarded to the anomaly scoring service(s) 502. The returned score 514 would be directly consumed by the relying system and the relying system would decide whether to rely on the cryptographic key material, such as described above.

Modules, Components and Logic

Certain embodiments are described herein as including logic or a number of components, modules, or mechanisms. Modules may constitute either software modules (i.e., code embodied on a machine-readable medium) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein are at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures may be employed. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
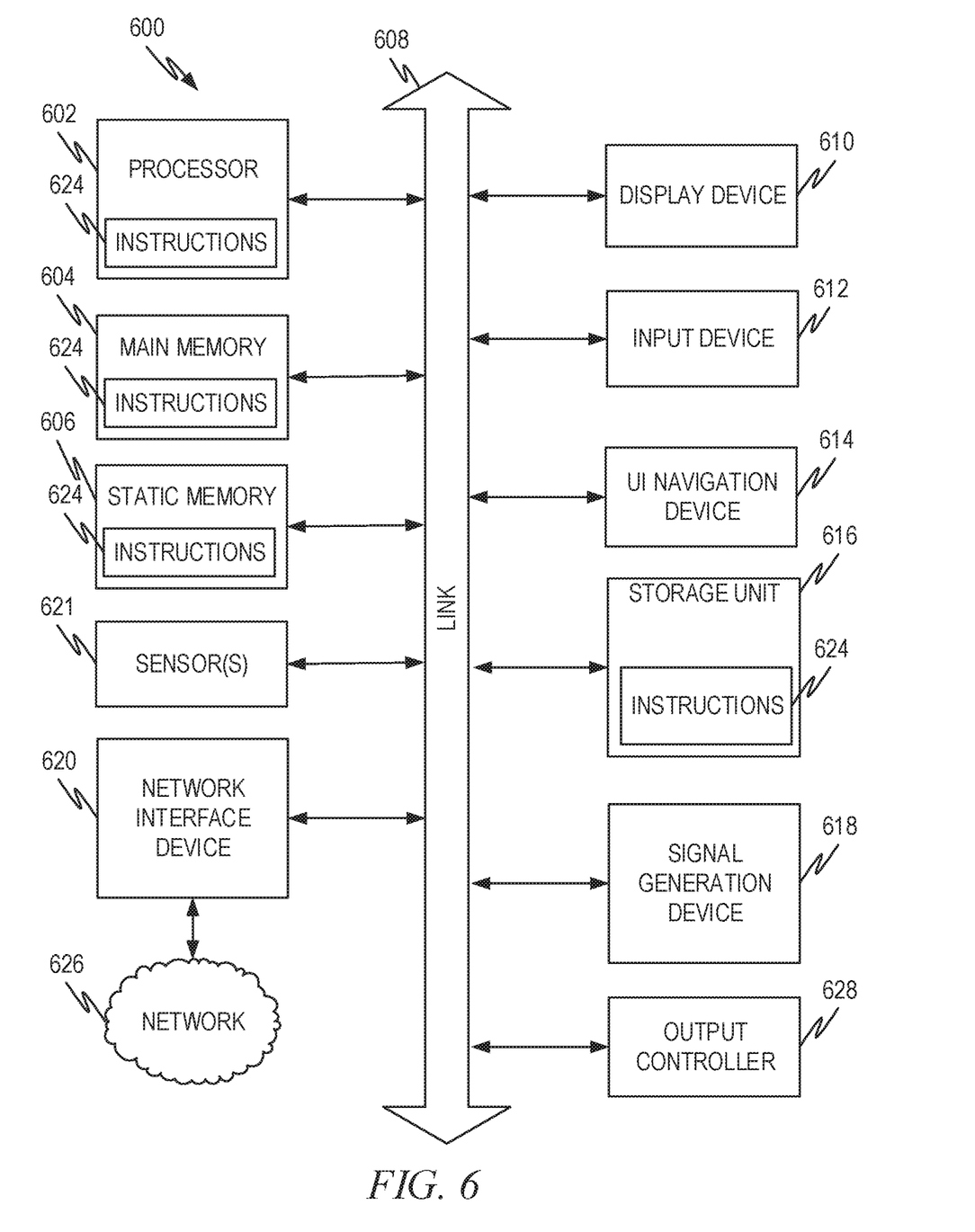
FIG. 6 is a block diagram of a machine in the example form of a processing system within which may be executed a set of instructions for causing the machine to perform any one or more of the methodologies discussed herein including the functions, systems and flow diagrams thereof.

FIG. 6 is a block diagram of a machine in the example form of a processing system within which may be executed a set of instructions for causing the machine to perform any one or more of the methodologies discussed herein including the functions, systems and flow diagrams thereof.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a smart phone, a tablet, a wearable device (e.g., a smart watch or smart glasses), a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the machine 600 includes at least one processor 602 (e.g., a central processing unit (CPU), a graphics processing unit (GPU), advanced processing unit (APU), or combinations thereof), a main memory 604 and static memory 606, which communicate with each other via bus 608. The machine 600 may further include graphics display unit 610 (e.g., a plasma display, a liquid crystal display (LCD), a cathode ray tube (CRT), and so forth). The machine 600 also includes an alphanumeric input device 612 (e.g., a keyboard, touch screen, and so forth), a user interface (UI) navigation device 614 (e.g., a mouse, trackball, touch device, and so forth), a storage unit 616, a signal generation device 628 (e.g., a speaker), sensor(s) 621 (e.g., global positioning sensor, accelerometer(s), microphone(s), camera(s), and so forth) and a network interface device 620.

Machine-Readable Medium

The storage unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604, the static memory 609, and/or within the processor 602 during execution thereof by the machine 600. The main memory 604, the static memory 609 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The term machine-readable medium specifically excludes non-statutory signals per se.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Transmission medium encompasses mechanisms by which the instructions 624 are transmitted, such as communication networks. Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for testing for anomalous cryptographic key material comprising:
   obtaining a set of cryptographic key material, each cryptographic key material in the set having a set of attributes, the number of attributes in the set of attributes defining a dimensionality of the set of cryptographic key material;
   creating an anomalous scoring model based on an estimated density derived from the set of cryptographic key material;
   receiving cryptographic key material from a relying system;
   calculating an anomaly score for the cryptographic key material based on the anomalous scoring model; and
   returning the anomaly score to the relying system, the relying system using the anomaly score to determine whether to honor a request associated with the cryptographic key material.

2. The method of claim 1, wherein creating the anomalous scoring model comprises at least the operations of:
   receiving a bias vector defining relative importance of the set of attributes;
   receiving a target dimension defining a dimensionality of an intermediate representation of the set of cryptographic key material;
   reducing the dimensionality of the set of cryptographic key material to the target dimension utilizing a first selected numerical method to form the intermediate representation; and
   creating the estimated density using the intermediate representation and a second selected numerical method.

3. The method of claim 2 wherein the first selected numerical method comprises at least one of:
   independent component analysis; and
   principle component analysis.

4. The method of claim 2 wherein the second selected numerical method comprises at least one of:
   parzen window;
   vector quantization;
   multivariate histograms; and
   kernel density estimation.

5. The method of claim 2 further comprising:
   receiving a second bias vector; and
   creating a second model based on the second bias vector and the set of cryptographic key material.

6. The method of claim 1 further comprising deploying the model to a second system.

7. The method of claim 1, further comprising sending the model to a second system in order to update a model on the second system.

8. A machine-readable medium having executable instructions encoded thereon, which, when executed by at least one processor of a machine, cause the machine to perform operations comprising:
   obtain a set of cryptographic key material, each cryptographic key material in the set having a set of attributes, the number of attributes in the set of attributes defining a dimensionality of the set of cryptographic key material;
   create an anomalous scoring model based on an estimated density derived from the set of cryptographic key material;
   receive cryptographic key material from a relying system;
   calculate an anomaly score for the cryptographic key material based on the anomalous scoring model; and
   return the anomaly score to the relying system, the relying system using the anomaly score to determine whether to honor a request associated with the cryptographic key material.

9. The medium of claim 8, wherein creating the anomalous scoring model comprises at least the operations of:
   receive a bias vector defining relative importance of the set of attributes;
   receive a target dimension defining a dimensionality of an intermediate representation of the set of cryptographic key material;
   reduce the dimensionality of the set of cryptographic key material to the target dimension utilizing a first selected numerical method to form the intermediate representation; and
   create the estimated density using the intermediate representation and a second selected numerical method.

10. The medium of claim 9 wherein the first selected numerical method comprises at least one of:
    independent component analysis; and
    principle component analysis.

11. The medium of claim 9 wherein the second selected numerical method comprises at least one of:
    parzen window;
    vector quantization;
    multivariate histograms; and
    kernel density estimation.

12. The medium of claim 9 further comprising:
    receive a second bias vector; and
    create a second model based on the second bias vector and the set of cryptographic key material.

13. The medium of claim 8 further comprising deploying the model to a second system.

14. The medium of claim 8, further comprising deploy the model to a second system in order to update a model on the second system.

15. A system comprising:
    a processor and executable instructions accessible on a machine-readable medium that, when executed, cause the system to perform operations comprising:
    obtain a set of cryptographic key material, each cryptographic key material in the set having a set of attributes, the number of attributes in the set of attributes defining a dimensionality of the set of cryptographic key material;
    create an anomalous scoring model based on an estimated density derived from the set of cryptographic key material;
    receive cryptographic key material from a relying system;
    calculate an anomaly score for the cryptographic key material based on the anomalous scoring model; and
    return the anomaly score to the relying system, the relying system using the anomaly score to determine whether to honor a request associated with the cryptographic key material.

16. The system of claim 15, wherein creating the anomalous scoring model comprises at least the operations of:
    receive a bias vector defining relative importance of the set of attributes;

receive a target dimension defining a dimensionality of an intermediate representation of the set of cryptographic key material;

reduce the dimensionality of the set of cryptographic key material to the target dimension utilizing a first selected numerical method to form the intermediate representation; and create the estimated density using the intermediate representation and a second selected numerical method.

17. The system of claim 16 wherein the first selected numerical method comprises at least one of:

independent component analysis; and principle component analysis.

18. The system of claim 16 wherein the second selected numerical method comprises at least one of:

parzen window; and kernel density estimation.

19. The system of claim 16 further comprising:

receive a second bias vector; and create a second model based on the second bias vector and the set of cryptographic key material.

20. The system of claim 15 further comprising deploying the model to a second system.

* * * * *

UNITED STATES PATENT AND TRADEMARK OFFICE
CERTIFICATE OF CORRECTION

PATENT NO. : 10,721,079 B2
APPLICATION NO. : 15/479581
DATED : July 21, 2020
INVENTOR(S) : Woods et al.

It is certified that error appears in the above-identified patent and that said Letters Patent is hereby corrected as shown below:

In the Specification

In Column 5, Line 31, delete "112" and insert --102-- therefor

In Column 9, Line 43, delete "Oja." and insert --Oja,-- therefor

In Column 9, Line 55, delete "(Duda." and insert --(Duda,-- therefor

In Column 9, Line 55, delete "Stork." and insert --Stork,-- therefor

In Column 9, Line 56, delete "York. N.Y.," and insert --York, NT,-- therefor

In Column 10, Line 42, after "data", insert --.--

In Column 11, Line 57, delete "configuration." and insert --configuration,-- therefor In Column 12, Line 62, delete "FIG. 5." and insert --FIG. 5-- therefor In Column 17, Line 49, delete "628" and insert --618-- therefor In Column 17, Line 59, delete "609," and insert --606,-- therefor In Column 17, Line 61, delete "609" and insert --606-- therefor Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*